United States Patent Office 3,198,796
Patented Aug. 3, 1965

3,198,796
DERIVATIVES OF BENZOBISTRIAZOLES
William Lindsay Mosby, North Plainfield, and Mary-Louise Silva, Somerville, N.J., assignors to American Cyanamid Company, Stamford, Conn., a corporation of Maine
No Drawing. Filed Aug. 21, 1963, Ser. No. 303,659
4 Claims. (Cl. 260—247.5)

This invention relates to, and has for its object, the provision of new compounds and the process for preparing said compounds.

More particularly, it relates to the product bis-(aminotriazolo)-p-quinone of the Formula I:

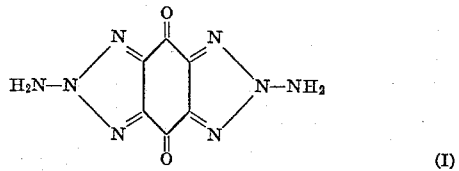

(I)

The quinone of Formula I is a colored, high-melting, water-insoluble solid which is useful as a pigment or a colorant in plastics and coating compositions.

The product of this invention can be obtained by the hydrolysis with aqueous strong acid of a compound of the Formula II:

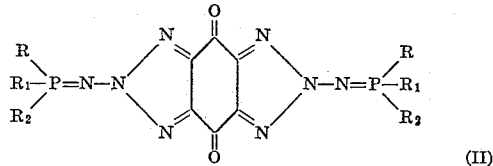

(II)

wherein R, $R_1$ and $R_2$ are individually either lower alkyl, phenyl, halophenyl, lower alkylphenyl, lower alkoxyphenyl, di-lower alkylamino, naphthyl, morpholino, pyrrolidino, piperidino or piperazino. This may be accomplished by treating the compound of Formula II with an aqueous strong acid (e.g., hydrochloric, sulfuric, nitric, phosphoric and toluenesulfonic acids) at elevated temperatures (for example, between 50° C. and reflux) employing a solvent (e.g., acetic acid, ethanol, methoxyethanol and ethyleneglycol). The product, obtained as a colored precipitate, may be separated by filtration and purified by conventional crystallization techniques.

The starting materials for the preparation of I are themselves new compounds. They are obtained from the reaction of 2,3,5,6-tetrazido-p-quinone with two moles of a phosphine or phosphorous triamide of the Formula III:

(III)

wherein R, $R_1$ and $R_2$ are as defined above.

The reaction is carried out in an inert solvent such as toluene, methylene chloride, ethyl acetate, ethylene chloride, benzene, chloroform, chlorobenzene, diethyl ether, dibutyl ether, carbon tetrachloride, nitromethane, etc. The reaction temperature may be between 20° and 200° C. The desired material may be separated from the reaction mixture by filtration or by evaporation of the solvent and then purified by conventional recrystallization techniques.

Among the alkyl phosphines which may be employed are the lower alkyl phosphines such as trimethylphosphine, triethylphosphine and tributylphosphine.

Among the triaryl phosphines which can be used are triphenylphosphine, the tritolylphosphines, such as tri-o-tolylphosphine, the chlorophenylphosphines, such as tris-(4-chlorophenyl)phosphine, the lower alkoxyphenylphosphines, such as tris(2-methoxyphenyl)phosphine, trinaphthylphosphines, and also mixed triaryl phosphines, such as diphenyl-p-tolylphosphine, diphenyl-4-methoxyphenylphosphine, diphenyl-4-chlorophenylphosphine, phenyl-bis-p-tolylphosphine, 4-chlorophenyl-bis-p-tolylphosphine.

The phosphorous triamides which may be used include phosphorous tripiperidide, phosphorous trimorpholide, N,N,N',N',N'',N''-hexaethylphosphorous triamide, N,N,N',N',N''N''-hexaisopropylphosphorous triamide.

The following examples in which parts are by weight are presented to illustrate the present invention.

EXAMPLE 1

N,N' - (4,8-dihydro-4,8-dioxo-2H,6H-benzo[1,2-d;4,5-d'] bis-triazole-2,6-diyl)bis(P,P,P-triphenylphosphine imide)

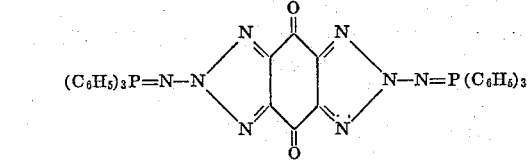

2,3,5,6-tetrazidobenzoquinone was prepared by slowly adding a solution of 1.50 parts of sodium azide in a mixture of 5 parts of water and about 10 parts of dimethylformamide to a solution of 1.23 parts of chloranil in about 40 parts of dimethylformamide while cooling. The reaction mixture was poured into about 200 parts of ice and water, and the precipitate was separated by filtration and washed with water. The wet product was dissolved in about 170 parts of methylene chloride, and the solution was dried over anhydrous magnesium sulfate. To the above solution of 2,3,5,6-tetrazidobenzoquinone there was slowly added 5.24 parts of triphenylphosphine at ambient temperature. The solution was concentrated by evaporating part of the solvent in vacuo. The precipitate was separated, washed with methyl cyclohexane and boiling nitromethane and recrystallized from chlorobenzene. The orange product became black at a temperature above 300° C., but remained unmelted at 360° C.

EXAMPLE 2

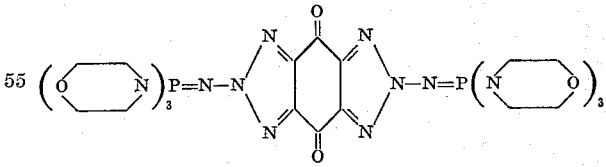

This product is prepared by reacting tetrazidobenzoquinone with trimorpholinophosphine in accordance with the procedure of Example 1.

EXAMPLE 3

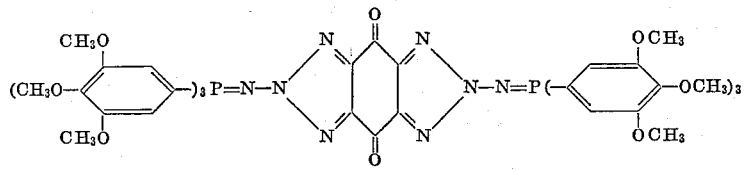

This product is obtained by reacting tetrazidobenzoquinone with tris-(3,4,5-trimethoxyphenyl)phosphine in accordance with the procedure of Example 1.

EXAMPLE 4

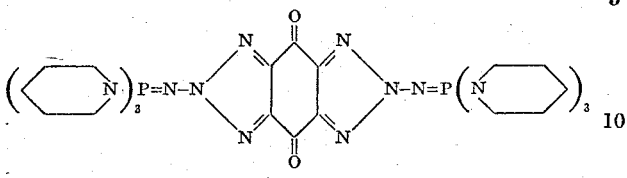

This product is obtained by reacting tripiperidinophosphine and tetrazidobenzoquinone in accordance with the procedure of Example 1.

EXAMPLE 5

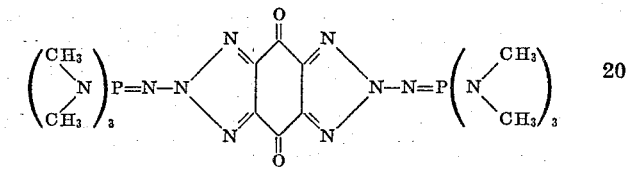

This product is obtained by reacting tris-dimethylaminophosphine and tetrazidobenzoquinone in accordance with the procedure of Example 1.

EXAMPLE 6

2,6-diamino-4,8-dihydro-2H,6H-benzo[1,2-d;4,5-d']bis-triazole-4,8-dione

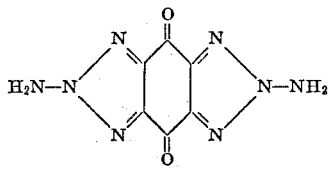

A suspension of 0.45 part of the product of Example 1 in 3 parts of glacial acetic acid plus about one part of concentrated hydrochloric acid was boiled for one minute. About one part of water was added slowly while boiling was continued. After cooling, the precipitate was separated by filtration and washed with methyl alcohol and petroleum ether. The product, after recrystallization from glycol diacetate, became black at a temperature above 300° C., but remained unmelted at 360° C.

The identical product is obtained when the products of Examples 2–5, respectively, are substituted for the product of Example 1 in the foregoing procedure.

We claim:
1. The compound of the formula:

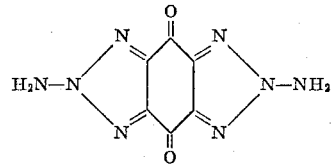

2. The compound of the formula:

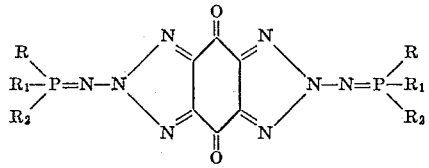

wherein R, $R_1$ and $R_2$ are individually selected from the group consisting of lower alkyl, phenyl, halophenyl, lower alkylphenyl, lower alkoxyphenyl, di-lower alkylamino, naphthyl, morpholino, pyrrolidino, piperidino and piperazino.

3. A process which comprises treating a compound of claim 2 with an aqueous strong acid at a temperature between 50° C. and reflux in the presence of a water miscible solvent, and recovering the product of the formula:

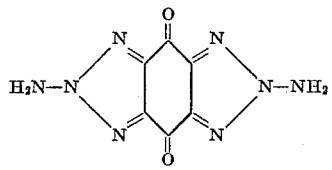

4. The process of claim 3 wherein the acid is a member selected from the group consisting of hydrochloric, sulfuric, nitric, phosphoric and toluene-sulfonic.

No references cited.

NICHOLAS S. RIZZO, *Primary Examiner*.